United States Patent [19]

Bathen

[11] Patent Number: 5,782,585
[45] Date of Patent: Jul. 21, 1998

[54] PRECISION DRILL FOR DRILLING NONCIRCULAR BORES

[75] Inventor: Roland Bathen, Stuttgart, Germany

[73] Assignee: Mahle GmbH, Stuttgart, Germany

[21] Appl. No.: 765,150

[22] PCT Filed: Sep. 21, 1995

[86] PCT No.: PCT/DE95/01315

§ 371 Date: Dec. 11, 1996

§ 102(e) Date: Dec. 11, 1996

[87] PCT Pub. No.: WO96/16762

PCT Pub. Date: Jun. 6, 1996

[30] Foreign Application Priority Data

Nov. 26, 1994 [DE] Germany ............ 44 42 218.0

[51] Int. Cl.⁶ .................................................. B23B 27/22
[52] U.S. Cl. ................. 408/17; 82/1.3; 408/69; 408/91; 409/75; 409/162
[58] Field of Search .................. 408/1.7, 62, 69, 408/91; 82/1.2, 1.3, 131; 409/75, 143, 162, 228, 229

[56] References Cited

U.S. PATENT DOCUMENTS

| 1,302,271 | 4/1919 | Anderson | 408/62 |
| 1,624,085 | 4/1927 | Wegner | 409/162 |
| 2,590,068 | 3/1952 | Pekrul | 82/1.2 |
| 4,638,694 | 1/1987 | Slee | 82/1.3 |
| 5,056,964 | 10/1991 | Naka et al. | 408/69 |
| 5,201,618 | 4/1993 | Malarz et al. | 409/143 |
| 5,634,748 | 6/1997 | Brazell et al. | 408/91 |

FOREIGN PATENT DOCUMENTS

| 430984 | 8/1989 | European Pat. Off. . | |
| 590283 | 8/1993 | European Pat. Off. . | |
| 2344775 | 3/1974 | Germany . | |
| 3529876 | 3/1987 | Germany . | |
| 3837172 | 5/1989 | Germany . | |
| 9106682 | 7/1991 | Germany . | |
| 3818827 | 9/1991 | Germany . | |
| 9211772 | 1/1994 | Germany . | |
| 4312937 | 10/1994 | Germany . | |
| 257705 | 11/1986 | Japan | 408/62 |
| 62-079901 | 4/1987 | Japan . | |
| 62-079902 | 4/1987 | Japan . | |
| 62-079903 | 4/1987 | Japan . | |
| 2112679 | 7/1983 | United Kingdom | 82/1.2 |

Primary Examiner—Daniel W. Howell
Assistant Examiner—Adesh Bhargava
Attorney, Agent, or Firm—Collard & Roe, P.C.

[57] ABSTRACT

A precision drill for drilling noncircular bores, comprising a drill bit on a shaft and a holder for the workpiece being drilled, for providing a drill that can operate economically at high speeds. The workpiece holder oscillates translationally in at least one direction at a frequency controlled by the speed of the drill bit, and moves along a path determined by the desired shape of the bore to be drilled.

3 Claims, 2 Drawing Sheets

PRECISION DRILL FOR DRILLING NONCIRCULAR BORES

The invention relates to a precision drilling machine for drilling noncircular bores according to the introductory part of patent claim 1.

Such precision drilling machines are known, for example from DE 38 18 827 C; EP 0 430 984 B; and DE 43 12 937 A.

In connection with said drills, the drilling spindle with the rotating bit, or only the drilling bit is periodically deflected as required when drilling the form of the bore to be drilled. Practically, any desired shape of bores can be drilled with said devices. Any shape of a bore is limited only by the technically possible kinetic dynamics of the drilling spindle or the drilling bit support.

Devices, in connection with which the drilling spindle or the entire drilling head is adjusted, only permit relatively low numbers of revolutions because of the relatively large masses to be moved.

Devices, in connection with which only a support of the drilling bit is deflected within the drilling head, can operate with comparatively higher numbers of revolution. In the last-mentioned case, the support of the drilling bit, however, has only relatively little rigidity, which impairs the quality of the work.

Based on the facts outlined above, the invention deals with the problem of drilling noncircular bores with high working quality and with the high rotary speeds required for economical operation, in a superior way and at more favorable cost than previously possible.

Said problem is solved with a design having the characteristic features of patent claim 1.

Deviating from the state of the art heretofore, the workpiece and not the drilling bit or its support, or the spindle, is periodically deflected for drilling a non-circular drilling form in connection with said solution. This results in a simplification in that the periodic motion of deflection needs not to be superimposed on a rotational motion, but rather represents the only form of motion for such workpiece.

The device according to the invention is particularly suitable for drilling bores with an oval round shape. In this case, the workpiece only has to run through one motion period with one rotation of the drilling bit. This is explained in greater detail in the following by reference to a diagram. On the other hand, with each deflection of the drilling bit the latter would have to run through two periods, i.e., twice the number of periods during each rotation, which means that the rotary speed applied in the work operation has to be kept in economically unfavorably low ranges, taking into account the limits in kinetic dynamics. For obtaining a bore with an oval basic shape, in connection with which practically any oval, noncircular shapes are achievable up to the circumferential zone, through which the long oval axis extends, the tool has to oscillate translatorily only in one direction.

According to claim 2, the deflection of the tool is controlled according to the given actual position of the drilling bit, in that a defined value of deflection is associated, for example in an electronic memory, with each actual position, such value being in each case transmitted to the deflecting device of the workpiece as the control quantity. Furthermore, usefully, the given actual position is also taken into account by a position control circuit.

In case the bores should additionally extend conically in the longitudinal direction, the drilling spindle can be supported in a deflectable way. Systems suitable for such deflectability are known per se.

Schematic diagrams for a better understanding of the invention are shown in the drawing, in which.

Figure 1:
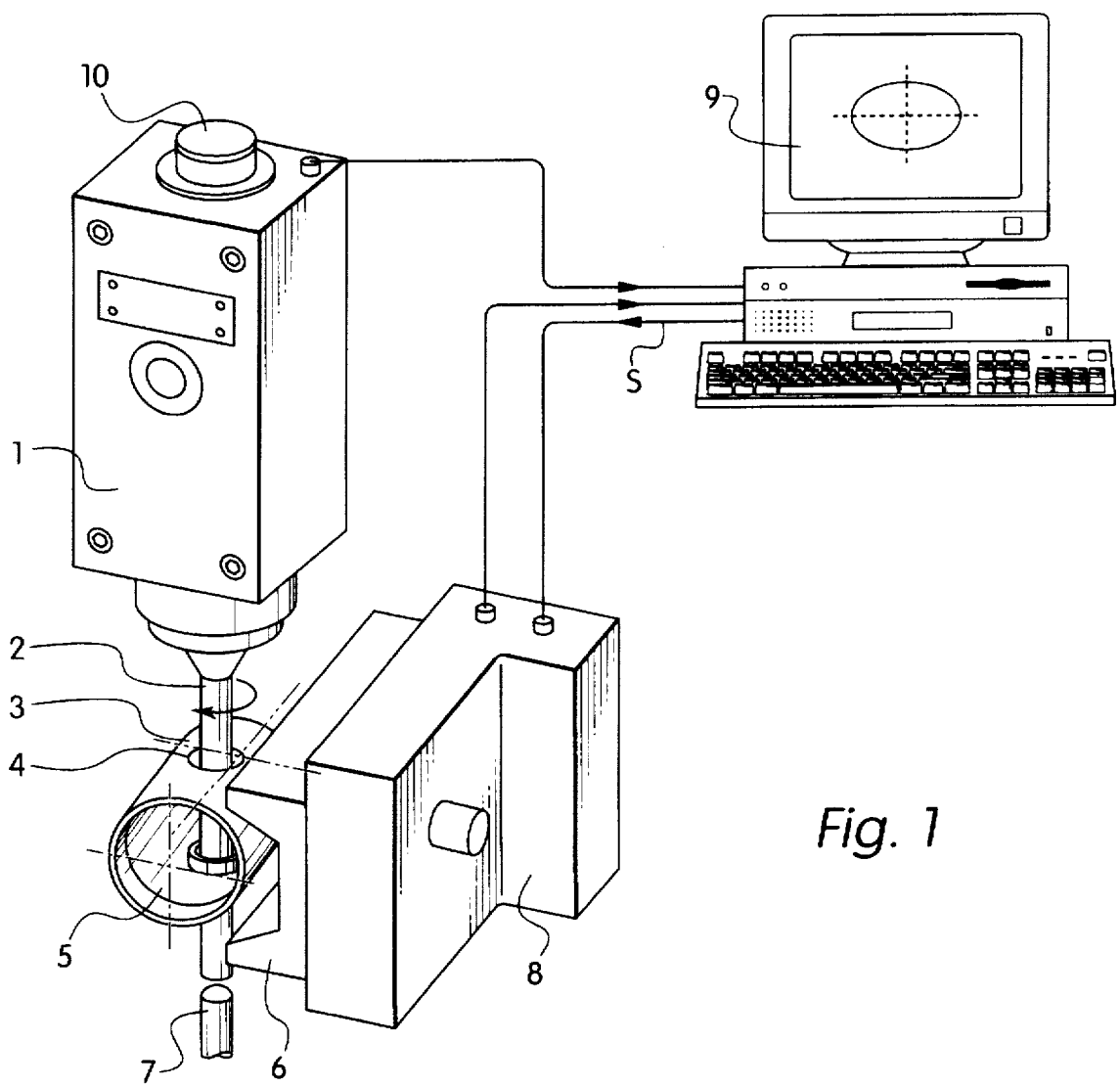
FIG. 1 shows a schematic, perspective representation of a device according to the invention.

With a precision drilling machine 1, a drilling bit 3 rigidly mounted on a spindle 2 rotates on a circular working path in the bore 4 of a piston serving as the workpiece 5.

The workpiece 5 is rigidly chucked in a holder 6.

The spindle 2 is countersupported in a tip 7. High rigidity of the spindle is obtained in this way.

The holder 6 is supported in a stationary receptacle 8 and oscillating in the direction of the double arrow A.

The oscillatory motion of the holder 6 is controlled as follows:

In an electronic memory 9, a shape of drilling to be produced is stored in a way such that a delection value for the oscillatory motion of the holder is associated with each actual position of the drilling bit. In this connection, it is basically necessary only to detect the given actual position of the rotating drilling bit 3 by means of a transmitter 10 synchronously rotating with the spindle 2 and to transmit it to the momery 9. The controlling quantity for the deflection of the oscillating holder 6 is then derived therefrom, said quantity being transmitted to a setting drive of said holder.

With the system described above, only shapes of drilling with an approximately oval basic shape can be drilled, i.e., a shape such in connection with which the circumferential areas disposed transversely to the motional direction A of the holder 6 are not variable based on their radial spacing from the center axis of the spindle 2. Said limitation can be cancelled in that the holder additionally also oscillates in a direction vertical to the one indicated by the double arrow A.

Usefully, the holder 6 is controlled not only based on the measured actual positions of the drilling bit 3 and the deflection-setting values associated with said positions in the memory 9, but adjusted with the help of a position control circuit. Such adjustment with the position control circuit is accomplished in that also the given actual position of the holder 6 is reported to the electronic memory 9 and compared there with the should-be position of the holder 6 associated with the respective actual position of the drilling bit 3. The determined deviation from an electronically preset drilling shape is then processed to a setting signal for the holder 6.

Figure 2:
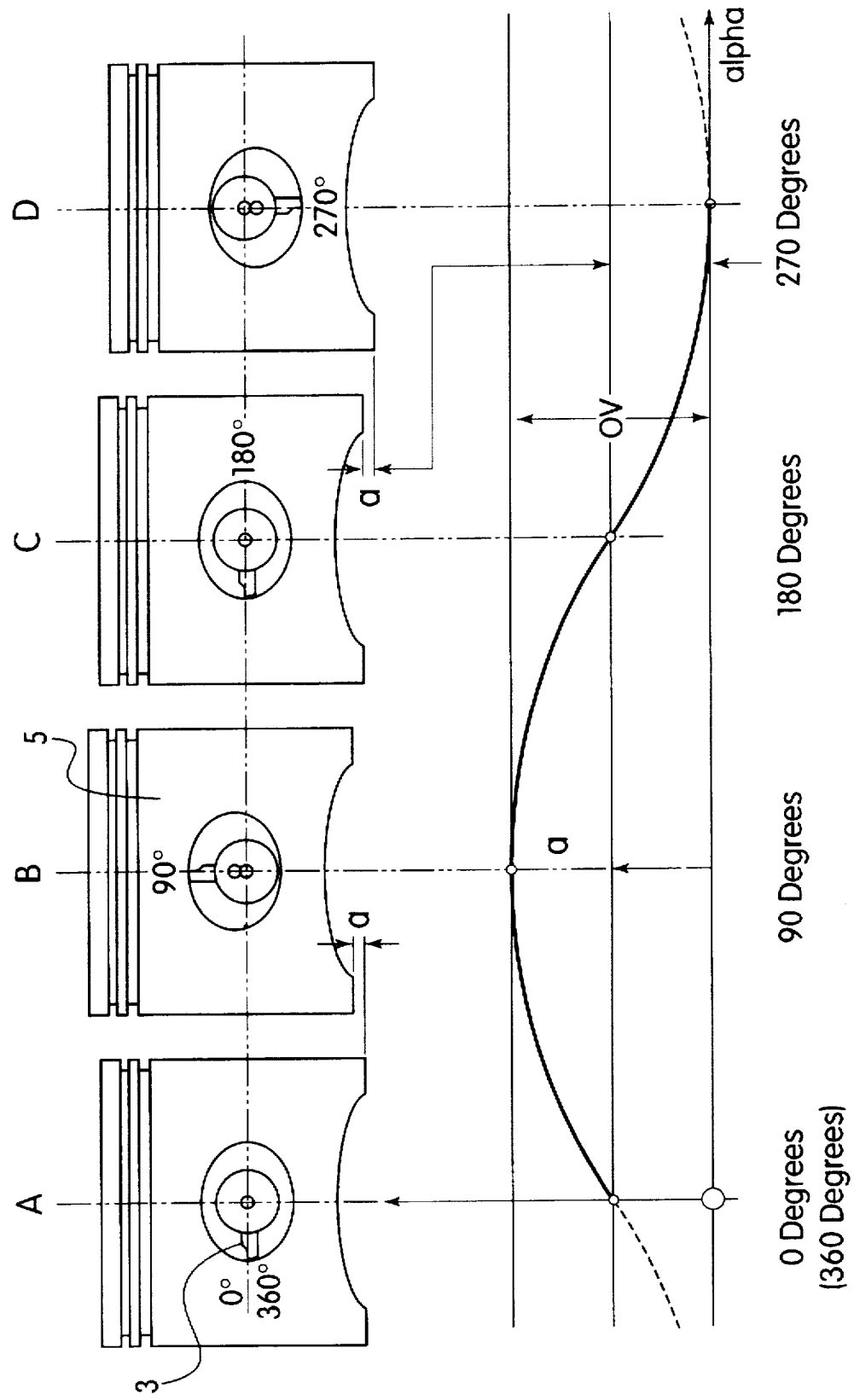
FIG. 2 shows a schematic representation of the patterns of motion of the drilling bit and a workpiece worked by said bit.

FIG. 2 shows in a very illustrating way the motion processes of the drilling bit 3 and the workpiece 5. In the top part of said figure, the positions of the workpiece are in each case shown at positions of the drilling bit 3 displaced by 90 degrees with respect to a three-quarter turn of the drilling bit 3. Said positions are denoted by A to D. The greatest deviations from the starting position A can be seen to be in opposite directions in connection with the positions B and D. Said deviations each are denoted by "a" as the path distance.

In the lower part of FIG. 2, the path of oscillation of the workpiece 5 is shown as a function of the rotary angle alpha of the drilling bit 3, whereby the oscillatory travel S is stated on the ordinate. The deflections "a" of the workpiece conforming to the positions B and D are shown enlarged in the presentation of the oscillatory path. The amplitude of the oscillation curve, which is denoted by OV, is a measure for the quality of the ovality of the bore.

I claim:

1. Precision drilling machine with a drilling bit on a drilling spindle and a holder for a workpiece to be worked for drilling noncircular bores, characterized in that the holder (6) for the workpiece (5) oscillates in a least one direction translatorily with a frequency proportional to the given number of revolutions per minute of the drilling bit (3) and in a path of deflection dependent on the shape of the bore to be drilled.

2. Precision drilling machine according to claim 1, characterized in that the deflection of the workpiece (5) is controlled as a function of the actual positions of the drilling bit (3) according to values associated with said actual positions and determining the shape of the bore.

3. Precision drilling machine according to claim 1, characterized in that the radial spacing of the drilling bit (3) from the center axis of the spindle (2) can be increased or reduced during the drilling operation according to a predetermined motional pattern for the purpose of influencing the diameter of the bore drilled.

* * * * *